United States Patent
Goel

(10) Patent No.: US 12,041,190 B2
(45) Date of Patent: Jul. 16, 2024

(54) SYSTEM AND METHOD TO MANAGE LARGE DATA IN BLOCKCHAIN

(71) Applicant: Prateek Goel, Bangalore (IN)

(72) Inventor: Prateek Goel, Bangalore (IN)

(*) Notice: Subject to any disclaimer, the term of this patent is extended or adjusted under 35 U.S.C. 154(b) by 206 days.

(21) Appl. No.: 17/849,620

(22) Filed: Jun. 25, 2022

(65) Prior Publication Data

US 2022/0417044 A1 Dec. 29, 2022

(30) Foreign Application Priority Data

Jun. 25, 2021 (IN) .............................. 202141028742

(51) Int. Cl.
| | |
|---|---|
| G06F 15/16 | (2006.01) |
| G06F 9/54 | (2006.01) |
| G06F 11/14 | (2006.01) |
| H04L 9/00 | (2022.01) |
| H04L 9/40 | (2022.01) |
| H04L 29/06 | (2006.01) |

(52) U.S. Cl.
CPC ............ *H04L 9/50* (2022.05); *G06F 11/1451* (2013.01); *G06F 11/1464* (2013.01); *H04L 63/0428* (2013.01); *H04L 63/12* (2013.01)

(58) Field of Classification Search
CPC ....... H04L 9/50; H04L 63/0428; H04L 63/12; G06F 11/1451; G06F 11/1464
USPC ......................................................... 713/168
See application file for complete search history.

(56) References Cited

U.S. PATENT DOCUMENTS

| | | | |
|---|---|---|---|
| 10,419,225 B2* | 9/2019 | Deery | H04L 63/123 |
| 10,986,080 B1* | 4/2021 | Huang | H04L 9/50 |
| 11,886,612 B2* | 1/2024 | Hsy | G06F 9/547 |
| 11,899,817 B2* | 2/2024 | Padmanabhan | G06F 21/64 |
| 11,922,532 B2* | 3/2024 | Alattar | G06F 21/16 |
| 2018/0337770 A1* | 11/2018 | Bathen | H04L 9/3239 |
| 2019/0036957 A1* | 1/2019 | Smith | H04L 9/3239 |
| 2019/0158594 A1* | 5/2019 | Shadmon | H04L 67/01 |
| 2019/0188711 A1* | 6/2019 | Wu | G06Q 20/065 |
| 2019/0379642 A1* | 12/2019 | Simons | H04L 63/0281 |

(Continued)

OTHER PUBLICATIONS

Exploring applications of blockchain in healthcare: road map and future directions, https://www.ncbi.nlm.nih.gov/pmc/articles/PMC10543232/ Yuvraj Singh, M. A. Jabbar, Shishir Kumar Shandilya, Olena Vovk, and Yaroslav Hnatiuk (Year: 2023).*

*Primary Examiner* — Hamza N Algibhah
(74) *Attorney, Agent, or Firm* — Rahman LLC

(57) ABSTRACT

A computer implemented method for managing large and sensitive data in a blockchain includes determining a master block store node from a plurality of block store nodes to add large and sensitive data to the blockchain after validation, and generating a block including the large and sensitive data that is validated and its metadata. If the block store nodes, a plurality of block verifier nodes and a plurality of block backup nodes of the blockchain are in synchronization, the method adds, using the master block store node, the block to its chain and generates a synchronization request to the block store nodes, the block verifier nodes and the block backup nodes of the blockchain. Based on assigned roles, the method performs enabling the block store nodes to store the block, enabling the block verifier nodes to store only the metadata, and enabling the block backup nodes to store the block.

20 Claims, 11 Drawing Sheets

(56) References Cited

U.S. PATENT DOCUMENTS

| | | | |
|---|---|---|---|
| 2020/0073758 A1* | 3/2020 | Natarajan | G06F 11/1474 |
| 2020/0242081 A1* | 7/2020 | Lee | G06F 16/1834 |
| 2020/0279052 A1* | 9/2020 | Wilke | G06F 21/64 |
| 2020/0394181 A1* | 12/2020 | Winarski | G06F 16/2255 |
| 2021/0004294 A1* | 1/2021 | Gupta | G06F 16/1844 |
| 2021/0119796 A1* | 4/2021 | Jose | H04L 9/3213 |
| 2021/0209131 A1* | 7/2021 | Wang | H04L 63/126 |
| 2021/0234666 A1* | 7/2021 | Amouyal | G06F 9/547 |
| 2021/0279695 A1* | 9/2021 | Rice | G06Q 20/12 |
| 2021/0312438 A1* | 10/2021 | Li | G06Q 20/3827 |
| 2021/0314162 A1* | 10/2021 | Li | H04L 9/3239 |
| 2021/0314179 A1* | 10/2021 | Liao | H04L 9/3297 |
| 2021/0377041 A1* | 12/2021 | Covaci | H04L 9/0637 |
| 2022/0366442 A1* | 11/2022 | Cho | G06Q 20/3678 |
| 2023/0122707 A1* | 4/2023 | Song | H04L 67/06 |
| | | | 711/163 |
| 2023/0269260 A1* | 8/2023 | Tang | H04L 63/1416 |
| | | | 726/1 |
| 2024/0031786 A1* | 1/2024 | Jung | H04W 4/46 |

\* cited by examiner

900

SYSTEM AND METHOD TO MANAGE LARGE DATA IN BLOCKCHAIN

BACKGROUND

Technical Field

Embodiments of this disclosure relates to blockchain data management, and more particularly, relates to a system and a method for managing large and sensitive data in the blockchain.

Description of the Related Art

Blockchain consists of servers/systems connected together in a closed premise (i.e. a private blockchain) such as data center, enterprise etc. or among enterprises (i.e. semi private blockchain) or across data centers, or even open to the public (i.e. public blockchain) where any computer/laptop/server can become a part of the blockchain.

Some of the primary features of blockchain as a technology are: data immutability, distributed and data integrity. The data immutability feature ensures that existing data is never over-written. Any new data is written by creating a new placeholder (i.e. a block) and attaching it to the existing list of blocks. This ensures history of data is preserved as the data goes through changes. The distributed feature enables that complete list of blocks are distributed over all the nodes participating in a blockchain, and ensures (a) if a system is offline, data can be fetched from other systems/nodes; and (b) if some systems are compromised, other systems can help restore the original data. In the data integrity feature, for every data created, a hash is stored in the block to ensure the content of the block is not altered. To further strengthen this, this hash is used for creating the next block and so on. This ensures the content of any block in the chain cannot be altered independently and a user may need to alter the hash of each and every block thereafter.

Because of the above noted technique, blockchain serves as a great platform to ensure trust and authenticity of the data among various parties participating in it. Trust and authenticity are the building blocks of the majority of businesses. As a result, there is a rush to bring as much data as possible onto the blockchain. Some of the current use cases are cryptocurrency, and supply chain. The cryptocurrency is simplistic and, in this, a blockchain maintains a ledger as the data in a block containing user id and money in the account. In the supply chain, a blockchain needs to typically maintain the item's unique identifier and its location and create a new block whenever the location changes.

In the examples mentioned above, it is noted that a size of data to be stored in a block of the blockchain is limited and does not increase considerably. In case of cryptocurrency, though the ledger can grow because of many users coming in but the total size does not grow exponentially as it needs to store the user id and the amount in the account. In case of supply chain, item details and its location are sufficient enough. Because of this limited size data, distribution to all the participating nodes does not take considerable space on the nodes, does not depend on larger bandwidth during distribution, and does not depend on a location of the node.

However, there is a question on how to handle the large sized, sensitive (possibly GDPR (General Data Protection Regulation) controlled) and different types of data in the blockchain. Data to be stored may be documents, health records, images, audio, video etc. Some of the industries who are actively exploring this are (a) healthcare industry to store and share patient records, lab reports, (b) insurance industry to link the hospitalization of patients to release of its funds etc., and (c) artists are looking to protect their copyright, etc. Because of the large data size, it is difficult to distribute the large data size blocks over the nodes.

In one prior approach, blockchain providers create a unique token corresponding to the large data file and use that token to keep it in the blockchain and carry out the further actions on it. This is also known as "data off the chain" in blockchain terms. However, such prior approach has several drawbacks such as the actual data is not distributed but its token, and if the actual data is tampered, there is no proof of who is correct, and it does not address the data sensitivity aspect.

Broadly the challenges to maintain data on the chain are the inability to control GDPR based data's distribution and does not honor data sensitivity. Because by default, the data is distributed to all nodes in the blockchain and they are not effective for large data sizes because of the distribution of large data size to all nodes, and various resources such as network bandwidth, server storage etc. become bottlenecks.

Thus, there is a need to manage large data in the blockchain, in particular to effectively manage the large and sensitive data in the blockchain.

SUMMARY

In view of the foregoing, embodiments herein provide a computer implemented method for managing large data in a blockchain. The method comprises validating large data to be uploaded to the blockchain upon receiving the large data. The blockchain comprises a plurality of block store nodes, a plurality of block verifier nodes and a plurality of block backup nodes. The method comprises, upon validation of the large data, determining a master block store node from the plurality of block store nodes to add the large data to the blockchain. The master block store node communicates its chain to the plurality of block store nodes, the plurality of block verifier nodes and the plurality of block backup nodes. The method comprises generating a block comprising the large data that is validated and its metadata. The method comprises generating, using the master block store node, one or more block verification requests to the plurality of block store nodes and the plurality of block verifier nodes of the blockchain. The method comprises determining whether the plurality of block store nodes, the plurality of block verifier nodes and the plurality of block backup nodes of the blockchain are in synchronization. If the plurality of block store nodes, the plurality of block verifier nodes and the plurality of block backup nodes of the blockchain are in synchronization, the method adds, using the master block store node, the block to its chain and generates a synchronization request to the plurality of block store nodes, the plurality of block verifier nodes and the plurality of block backup nodes of the blockchain. The method comprises assigning one or more roles to the plurality of block store nodes, the plurality of block verifier nodes and the plurality of block backup nodes of the blockchain. Based on the assigned roles, the method performs (a) enabling the plurality of block store nodes to store the block comprising the large data and the metadata, (b) enabling the plurality of block verifier nodes to store only the metadata, and (c) enabling the plurality of block backup nodes to store the block, for managing the large data.

In some embodiments, the method comprises adding a new node to the blockchain by collecting the new node properties comprising at least one of a type of node or its configuration.

In some embodiments, the method comprises pre-approving a set of new nodes with its properties into at least one of the plurality of block store nodes, the plurality of block verifier nodes or the plurality of block backup nodes. When a new node is added to the blockchain, the method determines a role to assign to the new node based on the pre-approval.

In some embodiments, the method comprises (a) configuring a sensitivity of the large data based on a sensitivity level that is predefined for the type of the large data to be stored in the blockchain, and (b) mapping the sensitivity level to the plurality of block store nodes and the plurality of block verifier nodes in the blockchain and determining a role for the plurality of block store nodes and the plurality of block verifier nodes based on the sensitivity level.

In some embodiments, the method comprises adding one or more nodes as a data validator to validate the large data before adding the large data to the blockchain.

In some embodiments, the method comprises providing a user interface that allows a user to upload the large data to the blockchain, and storing the large data that is uploaded in a staging area of the blockchain until the large data is validated.

In some embodiments, if a type of the large data is transaction data, the method validates the large data by referring to a content of a latest block in the blockchain and performing an operation comprising an addition or a deletion of data. If the type of the large data is non-transaction data, the method validates the large data using a smart contract which sends a notification to a validator associated with the non-transaction data.

In some embodiments, the method comprises adding the block with the large data to the blockchain and marking the block validation as false in the metadata of the block. When the validation of the large data is completed, the block is marked as validated.

In some embodiments, the method comprises implementing a validation chain comprising only the metadata of the block and a validation state of the block, instead of replicating the block again in the blockchain, thereby optimizing a storage space of the blockchain. When there is a change to the large data of the block, the method creates a new block.

In some embodiments, the metadata comprises information for validating (a) the block's position in the blockchain and (b) the large data and the metadata of the block. The metadata comprises at least one of a block header, a hash of the block and previous blocks, a pointer to a next block, or a timestamp of the block.

In some embodiments, if all the plurality of block store nodes, the plurality of block verifier nodes and the plurality of block backup nodes of the blockchain are not in synchronization, the method checks whether a minority of nodes from the plurality of block verifier nodes and the plurality of block backup nodes are not in synchronization. Sf yes, the method generates the synchronization request to the minority of nodes that are not in synchronization, or if no, the method identifies that the chain is corrupted and restores the chain from the plurality of block backup nodes.

In one aspect, one or more non-transitory computer readable storage mediums configured with instructions executable by one or more processors to cause the one or more processors to perform a computer implemented method for managing large data in a blockchain is provided. The method comprises validating large data to be uploaded to the blockchain upon receiving the large data. The blockchain comprises a plurality of block store nodes, a plurality of block verifier nodes and a plurality of block backup nodes. The method comprises, upon validation of the large data, determining a master block store node from the plurality of block store nodes to add the large data to the blockchain. The master block store node communicates its chain to the plurality of block store nodes, the plurality of block verifier nodes and the plurality of block backup nodes. The method comprises generating a block comprising the large data that is validated and its metadata. The method comprises generating, using the master block store node, one or more block verification requests to the plurality of block store nodes and the plurality of block verifier nodes of the blockchain. The method comprises determining whether the plurality of block store nodes, the plurality of block verifier nodes and the plurality of block backup nodes of the blockchain are in synchronization. If the plurality of block store nodes, the plurality of block verifier nodes and the plurality of block backup nodes of the blockchain are in synchronization, the method adds, using the master block store node, the block to its chain and generates a synchronization request to the plurality of block store nodes, the plurality of block verifier nodes and the plurality of block backup nodes of the blockchain. The method comprises assigning one or more roles to the plurality of block store nodes, the plurality of block verifier nodes and the plurality of block backup nodes of the blockchain. Based on the assigned roles, the method performs (a) enabling the plurality of block store nodes to store the block comprising the large data and the metadata, (b) enabling the plurality of block verifier nodes to store only the metadata, and (c) enabling the plurality of block backup nodes to store the block, for managing the large data.

In some embodiments, the one or more non-transitory computer readable storage mediums, which when executed by the one or more processors, further causes (a) configuring a sensitivity of the large data based on a sensitivity level that is predefined for the type of the large data to be stored in the blockchain, and (b) mapping the sensitivity level to the plurality of block store nodes and the plurality of block verifier nodes in the blockchain and determining a role for the plurality of block store nodes and the plurality of block verifier nodes based on the sensitivity level.

In some embodiments, if a type of the large data is transaction data, the method validates the large data by referring to a content of a latest block in the blockchain and performing an operation comprising an addition or a deletion of data. If the type of the large data is non-transaction data, the method validates the large data using a smart contract which sends a notification to a validator associated with the non-transaction data.

In some embodiments, the one or more non-transitory computer readable storage mediums, which when executed by the one or more processors, further causes implementing a validation chain comprising only the metadata of the block and a validation state of the block, instead of replicating the block again in the blockchain, thereby optimizing a storage space of the blockchain. When there is a change to the large data of the block, the method creates a new block.

In some embodiments, if all the plurality of block store nodes, the plurality of block verifier nodes and the plurality of block backup nodes of the blockchain are not in synchronization, the method checks whether a minority of nodes from the plurality of block verifier nodes and the plurality of block backup nodes are not in synchronization. If yes, the method generates the synchronization request to the minority of nodes that are not in synchronization, or if no, the method identifies that the chain is corrupted and restores the chain from the plurality of block backup nodes.

In another aspect, a system for managing large data in a blockchain is provided. The system comprises one or more processors and one or more non-transitory computer-readable memories coupled to the one or more processors and configured with instructions executable by the one or more processors to cause the system to perform operations comprising validating large data to be uploaded to the blockchain upon receiving the large data. The blockchain comprises a plurality of block store nodes, a plurality of block verifier nodes and a plurality of block backup nodes. The system, upon validation of the large data, determines a master block store node from the plurality of block store nodes to add the large data to the blockchain. The master block store node communicates its chain to the plurality of block store nodes, the plurality of block verifier nodes and the plurality of block backup nodes. The system generates a block comprising the large data that is validated and its metadata. The system generates, using the master block store node, one or more block verification requests to the plurality of block store nodes and the plurality of block verifier nodes of the blockchain. The system determines whether the plurality of block store nodes, the plurality of block verifier nodes and the plurality of block backup nodes of the blockchain are in synchronization. If the plurality of block store nodes, the plurality of block verifier nodes and the plurality of block backup nodes of the blockchain are in synchronization, the system adds, using the master block store node, the block to its chain and generates a synchronization request to the plurality of block store nodes, the plurality of block verifier nodes and the plurality of block backup nodes of the blockchain. The system assigns one or more roles to the plurality of block store nodes, the plurality of block verifier nodes and the plurality of block backup nodes of the blockchain. Based on the assigned roles, the system performs (a) enabling the plurality of block store nodes to store the block comprising the large data and the metadata, (b) enabling the plurality of block verifier nodes to store only the metadata, and (c) enabling the plurality of block backup nodes to store the block, for managing the large data.

In some embodiments, the system generates a sharing chain that includes a signature of the block and sharing conditions comprising details of one or more users to whom the large data to be shared with and a duration that the large data to be shared for, wherein when the system creates a sharing block, the blockchain triggers a smart contract to add a reference of the large data that is shared in their respective chain which enables a desired user to edit/view the shared large data when the desired user accesses the blockchain.

In some embodiments, the system configures a sensitivity of the large data based on a sensitivity level that is predefined for the type of the large data to be stored in the blockchain. The system maps the sensitivity level to the plurality of block store nodes and the plurality of block verifier nodes in the blockchain and determines a role for the plurality of block store nodes and the plurality of block verifier nodes based on the sensitivity level. The large data is received from a client device.

In some embodiments, if a type of the large data is transaction data, the system validates the large data by referring to a content of a latest block in the blockchain and performs an operation comprising an addition or a deletion of data. If the type of the large data is non-transaction data, the system validates the large data using a smart contract which sends a notification to a validator associated with the non-transaction data.

In some embodiments, if all the plurality of block store nodes, the plurality of block verifier nodes and the plurality of block backup nodes of the blockchain are not in synchronization, the system checks whether a minority of nodes from the plurality of block verifier nodes and the plurality of block backup nodes are not in synchronization. If yes, the system generates the synchronization request to the minority of nodes that are not in synchronization, or if no, the system identifies that the chain is corrupted and restores the chain from the plurality of block backup nodes.

The present disclosure facilitates management of the large data in the blockchain. In one embodiment, the large and sensitive data along with the metadata is stored in the plurality of block store nodes of the blockchain, while the metadata alone is stored on the plurality of block verifier nodes of the blockchain. In addition, the plurality of block backup nodes is used to back-up the blockchain and participates in data recovery only. This distributed architecture of the present invention facilitates the large and sensitive data to be maintained "on the chain" of the blockchain and overcomes the drawbacks/challenges of existing blockchain data management.

It should be appreciated that the instant disclosure ensures greater trust and authenticity to the data at all times as the blocks are trimmed as needed for propagation to all nodes based on their roles. In addition, aspects of the present disclosure support thin nodes such as mobile, laptops etc. also to be part of the blockchain network. In particular, more the nodes, more the trust. Furthermore, an owner of the data can also have a say in verification and can even participate in the backup of his/her blockchain. The owner is not at the sole mercy of the blockchain owner for his/her own data anymore.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. Further, one skilled in the relevant art will recognize that the embodiments can be practiced without one or more of the specific details or with other methods, components, materials and so forth. In other instances, well-known structures, materials, or operations are not shown in detail to avoid obscuring the features of the embodiments. Furthermore, the features/aspects described can be practiced in various combinations, though only some of the combinations are described herein for conciseness.

BRIEF DESCRIPTION OF THE DRAWINGS

The embodiments herein will be better understood from the following detailed description with reference to the drawings, in which.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS

Figure 1:
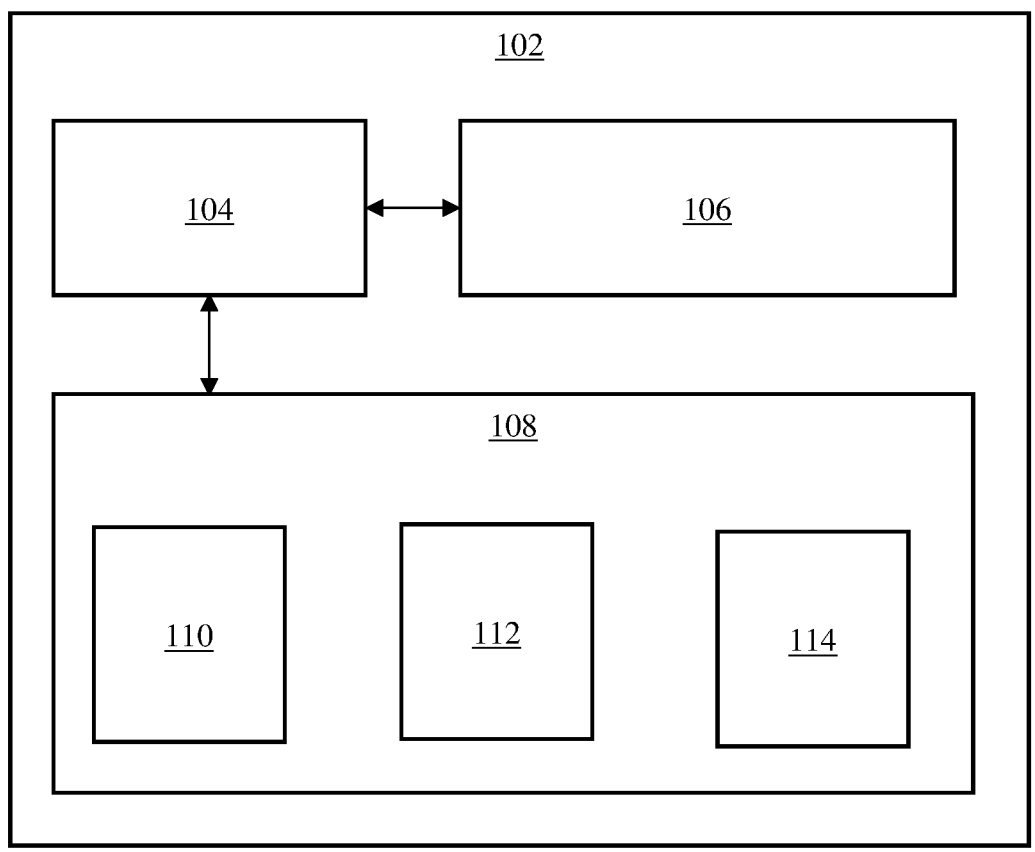
FIG. 1 illustrates a system for managing large data in a blockchain according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for a system and a method for managing large data in a blockchain. Referring now to the drawings, and more particularly to FIGS. 1 through 9, where similar reference characters denote corresponding features consistently throughout the figures, there are shown preferred embodiments.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element from another.

The terms "comprising", "comprises" and "comprised of" as used herein are synonymous with "including", "includes" or "containing", "contains", and are inclusive or open-ended and do not exclude additional, non-recited members, elements or method steps.

The terms "comprises," "comprising," "including," and "having," therefore specify the presence of stated features, integers, steps, operations, elements, modules, units and/or components, but do not forbid the presence or addition of one or more features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed. Example embodiments of the present disclosure are described with reference to the accompanying figures.

Terms and Definitions

As used in the present invention, the following terms are generally intended to have the meaning as set forth below, except to the extent that the context in which they are used indicate otherwise.

Large data: Large data refers to data having a size of few megabytes (MB) to terabytes (TB). The large data may be large and/or sensitive data.

Block store node: Block store node refers to a node that stores a complete block comprising metadata and block data in a blockchain.

Master block store node: Master block store node refers to a node that is selected from block store nodes for adding a block to the blockchain.

Block verifier node: Block verifier node is a node that stores only the metadata of a block in the blockchain.

Block backup node: Block backup node is a node that backs-up the complete block and/or the blockchain and participates in data recovery only.

Block: Block is a place in the blockchain where information is stored and encrypted.

Sensitive data: The sensitive data, or special category data, according to GDPR is any data that reveals a subject's information.

FIG. 1 illustrates a system 102 for managing large data in a blockchain 108 according to some embodiments herein. The system 102 comprises one or more processors 104 and one or more non-transitory computer-readable memories 106 coupled to the one or more processors 104 and configured with instructions executable by the one or more processors 104 to cause the system 102 to validated large data to be uploaded to the blockchain 108 upon receiving the large data. The large data may be large and/or sensitive data.

The blockchain 108 comprises a plurality of block store nodes 110, a plurality of block verifier nodes 112 and a plurality of block backup nodes 114. The system 102, upon validation of the large data, determines a master block store node from the plurality of block store nodes 110 to add the large data to the blockchain 108. The master block store node communicates its chain to the plurality of block store nodes 110, the plurality of block verifier nodes 112 and the plurality of block backup nodes 114. The system 102 generates a block comprising the large data that is validated and its metadata. The system 102 generates, using the master block store node, one or more block verification requests to the plurality of block store nodes 110 and the plurality of block verifier nodes 112 of the blockchain 108. The system 102 determines whether the plurality of block store nodes 110, the plurality of block verifier nodes 112 and the plurality of block backup nodes 114 of the blockchain 108 are in synchronization. If the plurality of block store nodes 110, the plurality of block verifier nodes 112 and the plurality of block backup nodes 114 of the blockchain 108 are in synchronization, the system 102 adds, using the master block store node, the block to its chain and generates a synchronization request to the plurality of block store nodes 110, the plurality of block verifier nodes 112 and the plurality of block backup nodes 114 of the blockchain 108. The system 102 assigns one or more roles to the plurality of block store nodes 110, the plurality of block verifier nodes 112 and the plurality of block backup nodes 114 of the blockchain 108. Based on the assigned roles, the system 102 performs (a) enabling the plurality of block store nodes 110 to store the block comprising the large data and the metadata, (b) enabling the plurality of block verifier nodes 112 to store only the metadata, and (c) enabling the plurality of block backup nodes 114 to store the block, for managing the large data.

In some embodiments, the system 102 comprises a block processor node that processes/performs computation on the large data, however, it does not store the large data. For example, the block processor node processes a large image, encodes/decodes of a video/audio file, and/or performs a machine learning (ML)/artificial intelligence (AI) on the large data in the block.

In some embodiments, the system 102 adds a new node to the blockchain 108 by collecting the new node properties comprising at least one of a type of node or its configuration. In some embodiments, the system 102 pre-approves a set of new nodes with its properties into at least one of the plurality of block store nodes 110, the plurality of block verifier nodes 112 or the plurality of block backup nodes 114. When a new node is added to the blockchain 108, the system 102 determines a role to assign to the new node based on the pre-approval.

In some embodiments, the system 102 configures a sensitivity of the large data based on a sensitivity level that is predefined for the type of the large data to be stored in the blockchain 108. The system 102 maps the sensitivity level to the plurality of block store nodes 110 and the plurality of block verifier nodes 112 in the blockchain 108 and determines a role for the plurality of block store nodes 110 and the plurality of block verifier nodes 114 based on the sensitivity level. The large data is received from a client device. In some embodiments, the system 102 adds one or more nodes as a data validator to validate the large data before adding the large data to the blockchain 108. In some embodiments, the system 102 provides a user interface that allows a user to upload the large data to the blockchain 108, and storing the large data that is uploaded in a staging area of the blockchain 108 until the large data is validated.

In some embodiments, if a type of the large data is transaction data, the system 102 validates the large data by referring to a content of a latest block in the blockchain 108 and performs an operation comprising an addition or a deletion of data. If the type of the large data is non-transaction data, the system 102 validates the large data using a smart contract which sends a notification to a validator associated with the non-transaction data. In some embodiments, the system 102 adds the block with the large data to the blockchain 108 and marks the block validation as false in the metadata of the block. When the validation of the large data is completed, the block is marked as validated.

In some embodiments, the system 102 implements a validation chain comprising only the metadata of the block and a validation state of the block, instead of replicating the block again in the blockchain 108, thereby optimizing a storage space of the blockchain 108. When there is a change to the large data of the block, the system 102 creates a new block. In some embodiments, the metadata comprises information for validating (a) the block's position in the blockchain 108 and (b) the large data and the metadata of the block. The metadata comprises at least one of a block header, a hash of the block and previous blocks, a pointer to a next block, or a timestamp of the block.

In some embodiments, if all the plurality of block store nodes 110, the plurality of block verifier nodes 112 and the plurality of block backup nodes 114 of the blockchain 108 are not in synchronization, the system 102 checks whether a minority of nodes from the plurality of block verifier nodes 112 and the plurality of block backup nodes 114 are not in synchronization. If yes, the system 102 generates the synchronization request to the minority of nodes that are not in synchronization, or if no, the system 102 identifies that the chain is corrupted and restores the chain from the plurality of block backup nodes 114.

In some embodiments, the system 102 generates a sharing chain that includes a signature of the block and sharing conditions comprising details of one or more users to whom the large data to be shared with and a duration that the large data to be shared for. When the system 102 creates a sharing block, the blockchain 108 triggers a smart contract to add a reference of the large data that is shared in their respective chain which enables a desired user to edit/view the shared large data when the desired user accesses the blockchain.

The system 102 facilitates management of the large data (i.e. large and sensitive data) in the blockchain 108. In one embodiment, the distributed architecture of the system 102 facilitates the large and sensitive data to be maintained "on the chain" of the blockchain and overcomes the drawbacks/challenges of existing blockchain data management.

Figure 2:
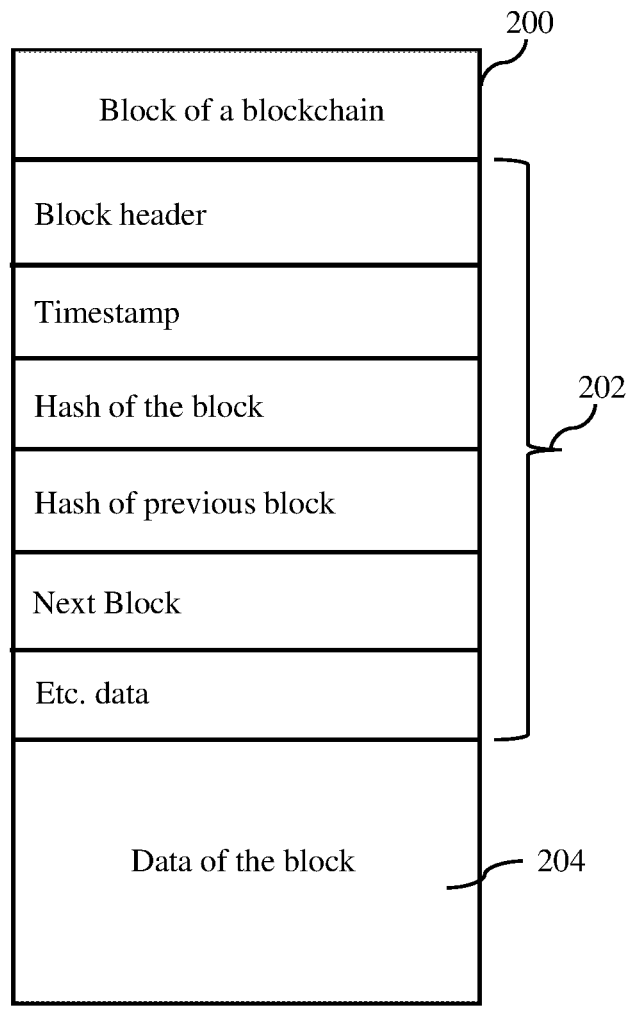
FIG. 2 illustrates a schematic illustration of a block of the blockchain of FIG. 1 according to some embodiments herein.

FIG. 2 illustrates a schematic illustration of a block 200 of the blockchain 108 of FIG. 1 according to some embodiments herein. The blockchain 108 comprises the plurality of block store nodes 110, the plurality of block verifier nodes 112 and the plurality of block backup nodes 114. A block 200 of the blockchain 108 comprises metadata 202 of the block and actual block data (e.g. large and/or sensitive data) 204. The metadata 202 comprises information for validating the block's position in the blockchain 108 and a content of the block 200 itself. The metadata 202 may comprise a block header, a hash of the block 200 and one or more previous blocks, a pointer to a next block, a timestamp of the block 200, etc. In some embodiments, nodes (e.g. the plurality of block store nodes 110, the plurality of block verifier nodes 112 and the plurality of block backup nodes 114) of the blockchain 108 are divided in a way that the blockchain 108 without the actual block data 204 goes to nodes which meet the criteria of sensitivity including General Data Protection Regulation (GDPR) regulations and have enough resources for efficient working of the blockchain 108. Other nodes may have only the metadata 202 of the block 200 preserved in the same blockchain structure as in the blockchain 108 with real data.

Figure 3:
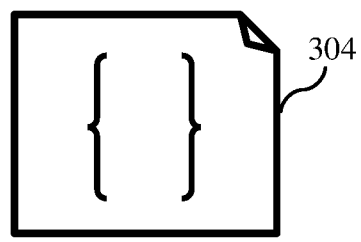
FIG. 3 illustrates a schematic illustration of an initialization of the blockchain using the system of FIG. 1 according to some embodiments herein.
Figure 3:
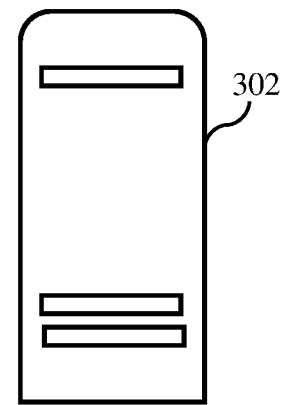

FIG. 3 illustrates a schematic illustration of an initialization of the blockchain 108 using the system 102 of FIG. 1 according to some embodiments herein. The system 102 creates a first node 302 which is initialized with the blockchain 108. The first node 302 may be any node selected from a virtual machine (VM), a heavy server, etc. During the initial configuration 304, the system 102 may configure a sensitivity of large data (e.g. large and sensitive data). The sensitive large data, or special category data, according to GDPR is any data that reveals a subject's/user's information. The system 102 configures a sensitivity of the large data based on a sensitivity level that is predefined for a type of the large data to be stored in the blockchain 108. For example, a financial record may fall under General Data Protection Regulation (GDPR) sensitivity. Health records, government proofs may be classified as personal confidential, etc. Since the data (e.g. large data) to be stored in the blockchain 108 may be any sort of data, the system 102 may configure smart contracts based on the sensitivity of the large data (e.g. large and sensitive data) and a type of validation to help in data validation. The smart contract may be to call application programming interface (API), notification, or may be a set of nodes which operates on this large data and performs the required validation.

In some embodiments, the system 102 pre-approves a set of new nodes with its properties into at least one of the plurality of block store nodes 110, the plurality of block verifier nodes 112 or the plurality of block backup nodes 114. When a new node is added to the blockchain 108, the system 102 determines a role to assign to the new node based on the pre-approval. In some embodiments, the system 102 maps the sensitivity level to the plurality of block store nodes 110 and the plurality of block verifier nodes 112 in the blockchain 108 and determines a role for the plurality of block store nodes 110 and the plurality of block verifier nodes 114 based on the sensitivity level.

Figure 4:
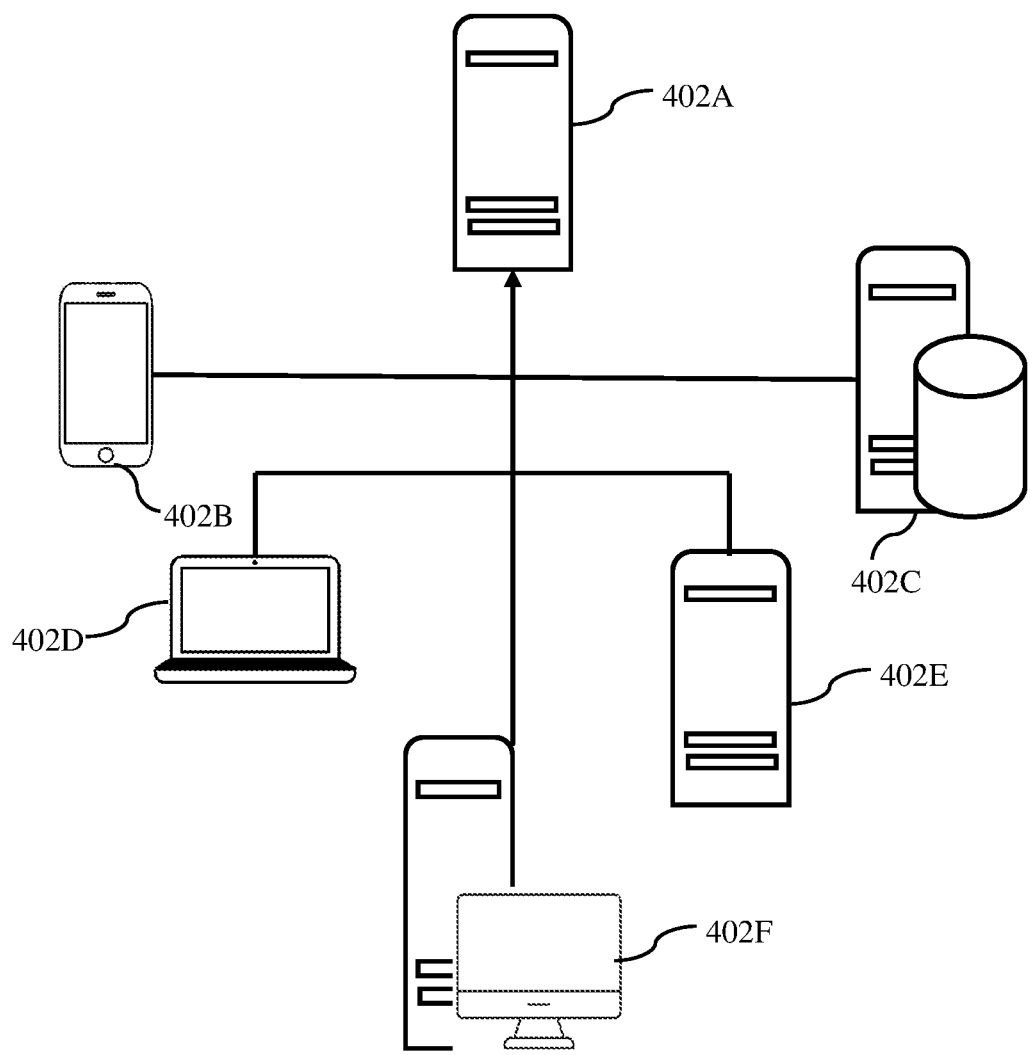
FIG. 4 illustrates an exemplary illustration of one or more nodes that are connected together in the blockchain of FIG. 1 according to some embodiments herein.

FIG. 4 illustrates an exemplary illustration of one or more nodes 402A-F that are connected together in the blockchain 108 of FIG. 1 according to some embodiments herein. The one or more nodes 402A-F may be a mobile, a laptop, a server, etc. The one or more nodes 402A-F may be the plurality of block store nodes 110, the plurality of block verifier nodes 112 and the plurality of block backup nodes 114. In some embodiments, whenever a new node needs to be added to the blockchain 108, the system 102 adds the new node to the blockchain 108 by collecting the new node properties comprising at least one of a type of node or its configuration. The new node may be a mobile, a laptop, a server, etc. Based on the properties of the new node, the system 102 may classify the new node as the block store node 110, the block verifier node 112 or the block backup node 114. The block store node 110 is a node that stores the complete block (i.e. both the metadata and the large data) in the blockchain 108. The block verifier node 112 is a node that stores only the metadata of the block in the blockchain 108. The block backup node 114 is a node that backs-up the complete block and/or the blockchain 108 and participates in data recovery only.

In some embodiments, the system 102 pre-approves a set of new nodes (e.g. one or more nodes 402A-F) with its properties into at least one of the plurality of block store nodes 110, the plurality of block verifier nodes 112 or the plurality of block backup nodes 114. In such a case, when the new node is added or connected to the blockchain 108, the system 102 determines and assigns a role to the new node based on the pre-approval instead of validating the requirements of the system 102. This may occur when the blockchain 108 is managed privately by a user (e.g. an owner), but it is opened up for other users. Hence, the user/the owner may provide required permissions to other users.

In some embodiments, the sensitivity of the large data (e.g. large and sensitive data) to be stored influences a role assignment of a node. Based on the GDPR sensitive large data, the system 102 may classify the one or more nodes such as the mobile 402B, the laptop 402D, the desktops 402F (i.e. moveable systems) as the block verifiers nodes 112. The system 102 may assign a block backup role to special nodes crafted for backing up of the blockchain 108 whenever a new block is added to the blockchain 108. The system 102 may allow the user or a data creator to configure a private/an external backup server for his/her blockchain. In some embodiments, the one or more nodes 402A-F may be maintained privately, or cross organization or even public. In some embodiment, the system adds a node additionally with a role of data validator for validating the large data before it can be added to the blockchain 108.

Figure 5:
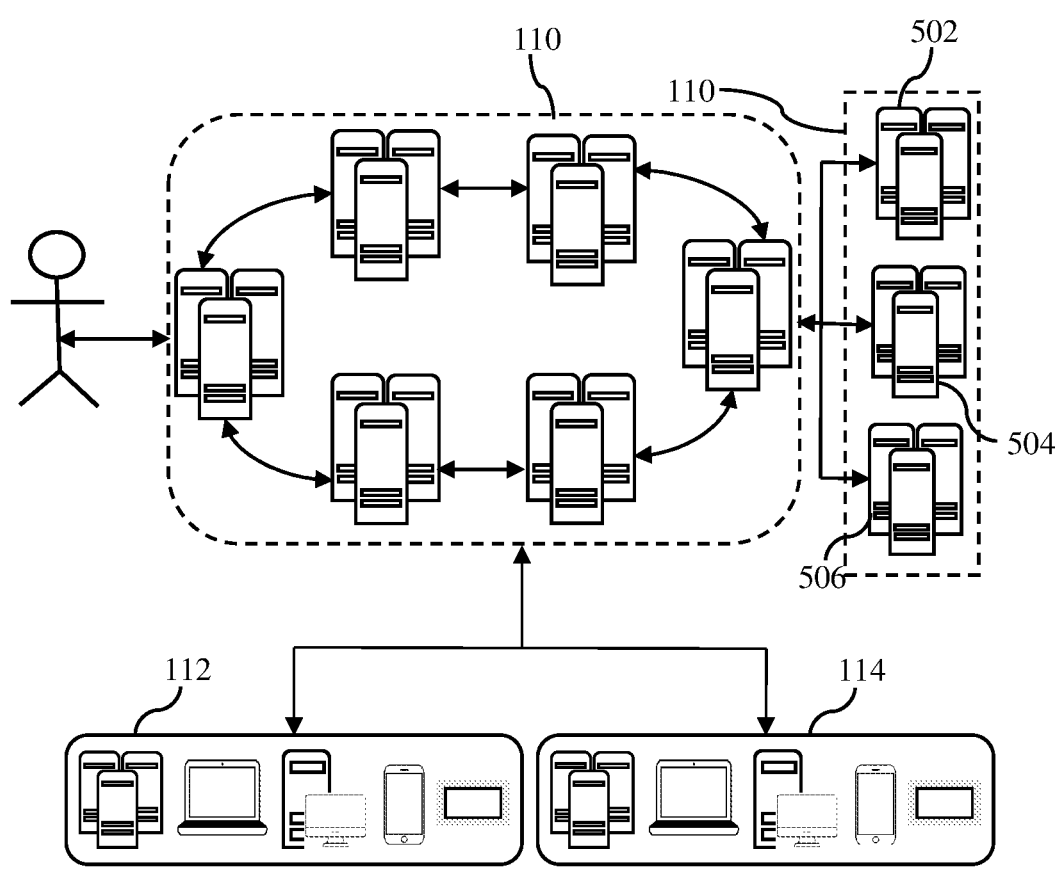
FIG. 5 illustrates an exemplary distributed architecture of the system of FIG. 1 according to some embodiments herein.

FIG. 5 illustrates an exemplary distributed architecture of the system 102 of FIG. 1 according to some embodiments herein. Whenever a user wants to upload large data (e.g. large and sensitive data) to the blockchain 108, the system 102 provides a user interface that enables the user to login into an application portal and upload the large data to the blockchain 108. The uploaded large data is stored in a staging area of the blockchain 108 and is processed for validation. The blockchain 108 comprises the plurality of block store nodes 110, the plurality of block verifier nodes 112 (e.g. any verifier end user, small or medium enterprises, etc.) and the plurality of block backup nodes 114 (e.g. an owner of data and trusted organizations). The plurality of block store nodes 110 may be connected together in a closed network. The plurality of block store nodes 110 may be extended from one or more enterprises (e.g. a first enterprise 502, a second enterprise 504 and a third enterprise 506).

The system 102 may validate the large data based on a type of the large data. If the type of the large data is transaction data (i.e. transaction data to which some data is added or deleted from what is already available, for example, money in account, available capacity of slots), the system validates the large data by referring to a content of a latest block in the blockchain 108 and performs an operation comprising the addition or the deletion of data. In other words, the transaction data is data where a mathematical operation ensures the correctness of a transaction. If the transaction data that is added or deleted is deemed valid, the system 102 may add a new block to the blockchain 108 with the processed transaction and other details.

In some embodiments, if the type of the large data is non-transaction data, the system validates the large data using a smart contract which sends a notification to a validator associated with the non-transaction data. The non-transaction data may be structured data and may comprise data in a specific format, but cannot be mathematically operated to arrive at validation or documents (e.g. word, pdf, images etc.) or even audio and video files. In such cases, the system 102 may use the smart contract when a user uploads the large data. Since the type of large data is known, the system 102 stores the large data in the blockchain 108 and the smart contract of the blockchain 108 sends a notification to a validator associated with the non-transaction data. In some embodiments, the smart contracts are similar to background processes which keep running in the background until their operation is performed or a condition is satisfied. In some embodiments, the smart contract is a computer program or a transaction protocol which is intended to automatically execute, control or document legally relevant events and actions according to the terms of a contract or an agreement.

In some embodiments, the system 102 adds the block with the large data to the blockchain 108 and marks the block validation as false in the metadata of the block. When the validation of the large data is completed, the block is marked as validated. The update of validation status may be maintained by the smart contract. The smart contract may keep track of the number of validations needed and validated so far. In some embodiments, the system 102 implements a validation chain comprising only the metadata of the block and a validation state of the block, instead of replicating the block again in the blockchain, thereby optimizing a storage space of the blockchain 108. When there is a change to the large data of the block, the system 102 creates a new block. However, for validation purposes, system 102 may create a separate chain forked from a first block which contains a signature of the data block whose validation status is being maintained.

In some embodiments, upon successful validation, the system 102 adds the block with the large data and validation record to the blockchain 108. The system 102 adds the block to the blockchain 108 by (a) determining a master block store node from the plurality of block store nodes 110, (b) generating, using the master block store node, one or more block verification requests to the plurality of block store nodes 110 and the plurality of block verifier nodes 112 of the blockchain 108 to check their state of in the blockchain 108, (c) comparing the states in the blockchain 108. If the master block store node does not include a chain, the master block store node syncs itself with the blockchain on other block store nodes and continues with the process of adding the block to the blockchain 108. If the nodes (e.g. the master block store node, the plurality of block store nodes 110 and the plurality of block verifier nodes 112) have different chains, the system 102 may generate a chain synchronization request to other nodes so that all nodes have the same view of the chain. Once the synchronization is completed, the node may continue with the process of adding the block to the blockchain 108. In some embodiment, if majority of nodes are not in synchronization, the plurality of block verifier nodes 112 may be referred to validate and store the large data on to the blockchain 108 and continue with the process.

Once a consensus is arrived, the system 102 may add the block to the blockchain 108 by a selected node (i.e. the master block store node) and triggers a synchronization to all nodes. The nodes that act as block stores nodes 110 receive the complete block i.e. the metadata and the large data together. The nodes that act as verifiers receive only metadata. In case of the block backup nodes 114, the complete block is transferred for backup.

Data Operations in Blockchain

Now the large data (e.g. large and sensitive data) is available in the blockchain 108 satisfying trust and authenticity requirements, the system 102 enables access to the data for read, update, sharing and deletion operations.

Read operation: Creator reading the uploaded content/large data (e.g. large and sensitive data) is straightforward. The system 102 may fetch and display a latest block in the blockchain 108 for the large data. The system 102 may provide an option to the creator to view past versions of the large data. Other users may not able to read until the large data is shared with them.

Update operation: Creator may easily do the same as read operation. However, when the contents/the large data (e.g. large and sensitive data) are updated, the system 102 may treat it as a new block and the process is repeated.

Sharing operation: Creator may share the large data (e.g. large and sensitive data) with other users. For sharing purposes, the system 102 may comprise a sharing chain which includes the data block signature and the sharing conditions such as the users to whom it is shared with and a duration that it is shared for, if configured. When the system 102 creates a sharing block, the blockchain 108 may trigger a smart contract to add a shared content/data reference in the respective user chain. This may enable a desired user to edit/view the shared content/large data when he/she accesses the blockchain 108. With the help of smart contracts, based on sharing conditions, the system 102 may revoke sharing rights automatically as set. If a default sharing condition is set, whenever the large data is uploaded, the system 102 automatically creates a sharing entry.

Deletion operation: When the large data (e.g. large and sensitive data) is to be deleted, the system 102 deletes the chain corresponding to the large data along with its versions, sharing and validation chains. In case, if the deleted data need to be retrieved, the system 102 retrieves the deleted data from the block backup nodes 114. Before the actual deletion in the blockchain 108, first the references of the large data from the sharing chain are removed so that no one can access the data while it is being deleted. Post that only, the block is deleted.

Figure 6A:
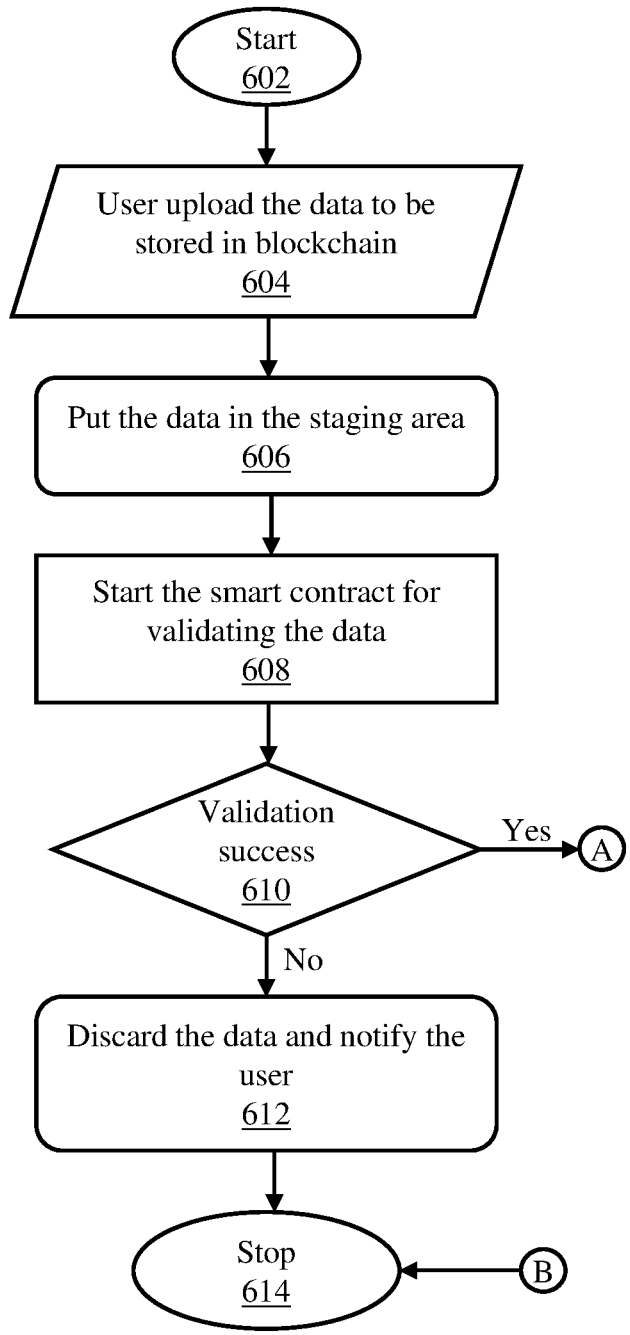
FIGS. 6A and 6B illustrate a process of managing large data in the blockchain using the system of FIG. 1 according to some embodiments herein.
Figure 6B:
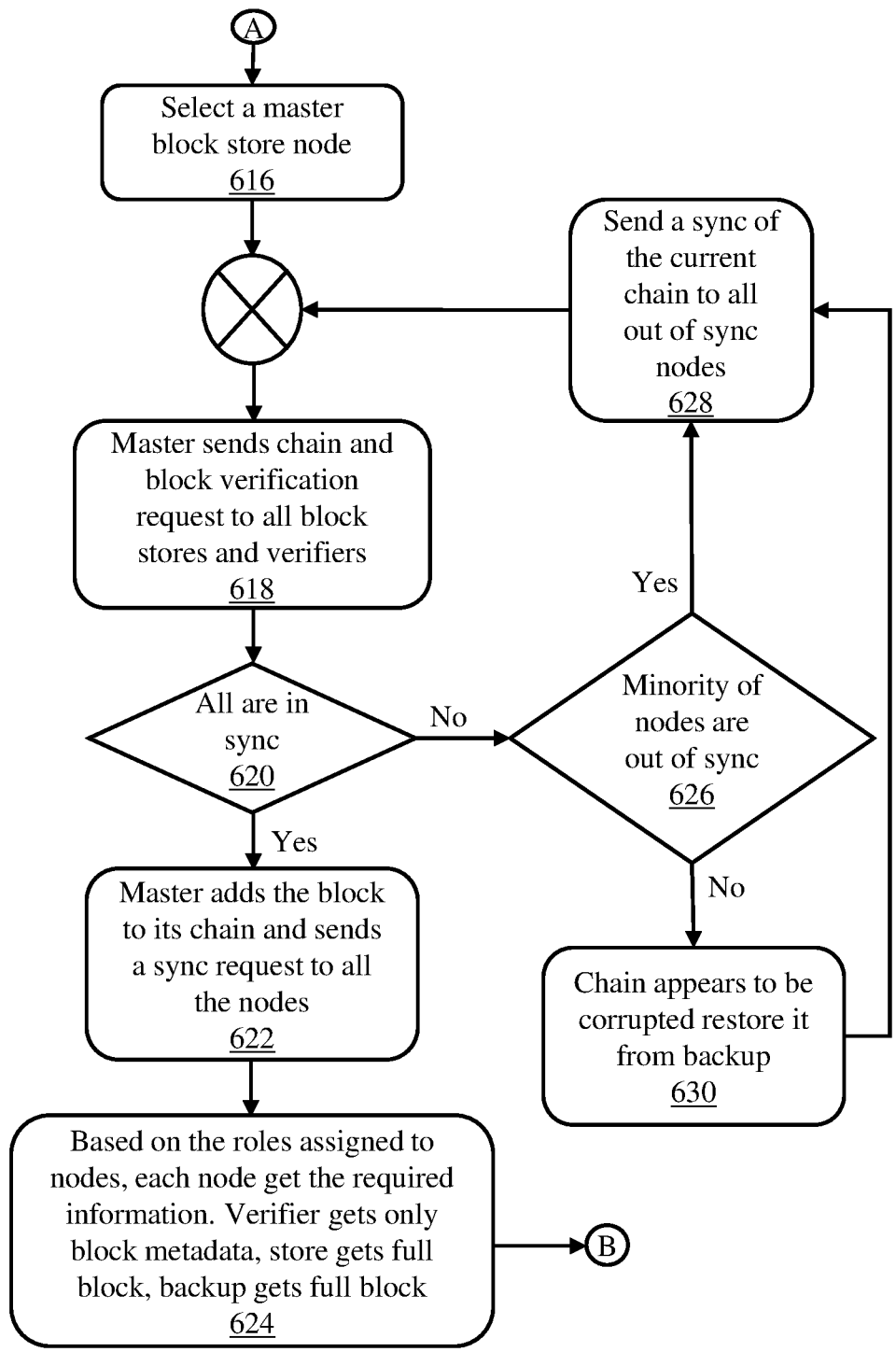

FIGS. 6A and 6B illustrate a process of managing large data in the blockchain 108 using the system 102 of FIG. 1 according to some embodiments herein. At a step 602, the system 102 starts the initialization of the blockchain 108. At a step 604, the system 102 provides a user interface that allows a user to upload the large data (e.g. large and sensitive data) to be stored in the blockchain 108. At a step 606, the large data is stored in a staging area of the blockchain 108 until the large data is validated. At a step 608, the system 102 validates the large data using a smart contract. The smart contract sends a notification to a validator associated with the large data. At a step 610, if the validation of the large data is successful, the process goes to a step 616. Else, the system 102 discards the large data and notify the user at a step 612. At a step 614, the system 102 stops the process of adding the large data to the blockchain 108. At a step 616, the system 102, upon validation of the large data, determines a master block store node from the plurality of block store nodes 110 to add the large data to the blockchain 108. At a step 618, the master block store node communicates/sends its chain and one or more block verification requests to the plurality of block store nodes 110, the plurality of block verifier nodes 112 and the plurality of block backup nodes 114. At a step 620, the system 102 determines whether the plurality of block store nodes 110, the plurality of block verifier nodes 112 and the plurality of block backup nodes 114 of the blockchain 108 are in synchronization or not. If yes, the system 102 adds, using the master block store node, the block 200 to its chain and generates a synchronization request to the plurality of block store nodes 110, the plurality of block verifier nodes 112 and the plurality of block backup nodes 114 of the blockchain 108 at a step 622. At a step 624, the system 102 assigns one or more roles to the plurality of block store nodes 110, the plurality of block verifier nodes 112 and the plurality of block backup nodes 114 of the blockchain 108. Based on the assigned roles, the system 102(a) enables the plurality of block store nodes 110 to store the block 200 comprising the large data and the metadata 202, (b) enables the plurality of block verifier nodes 112 to store only the metadata 202, and (c) enables the plurality of block backup nodes 114 to store the block 200, for managing the large data and go to the step 614 for stop the process. If all the plurality of block store nodes 110, the plurality of block verifier nodes 112 and the plurality of block backup nodes 114 of the blockchain 108 are not in synchronization, the system 102 checks whether a minority of nodes from the plurality of block verifier nodes 112 and the plurality of block backup nodes 114 are not in synchronization at a step 626. If yes, the system 102 generates the synchronization request to the minority of nodes that are not in synchronization at a step 628. If the system 102 identifies that a majority of nodes from the plurality of block verifier nodes 112 and the plurality of block backup nodes 114 are not in synchronization at the step 626, then the system 102 identifies that the chain is corrupted and restores the chain from the plurality of block backup nodes 114 at a step 630. The step 628 and the step 630 may be repeated using a loop till the plurality of block store nodes 110, the plurality of block verifier nodes 112 and the plurality of block backup nodes 114 of the blockchain 108 are in synchronization.

Figure 7A:
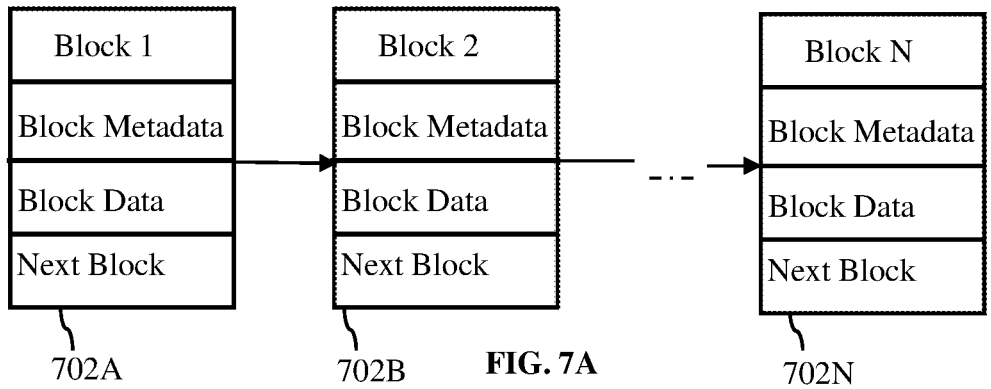
FIG. 7A illustrates an exemplary blockchain view of the plurality of block store nodes of FIG. 1 according to some embodiments herein.
Figure 7B:
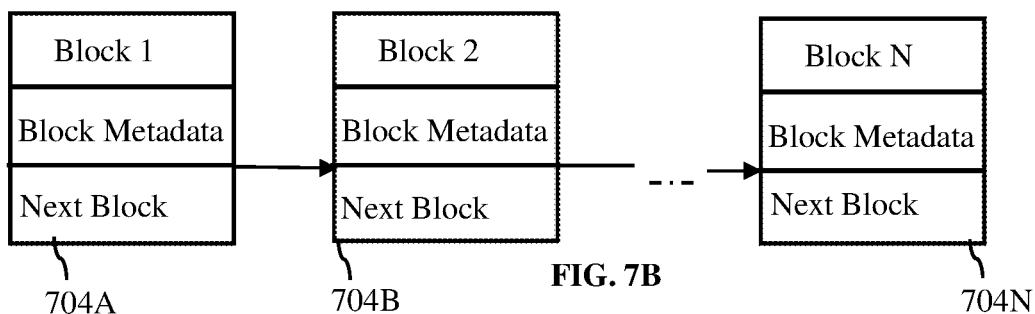
FIG. 7B illustrates an exemplary blockchain view of the plurality of block verifier nodes of FIG. 1 according to some embodiments herein.
Figure 7C:
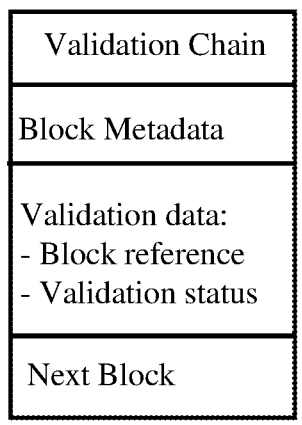
FIG. 7C illustrates an exemplary view of a validation chain according to some embodiments herein.
Figure 7D:
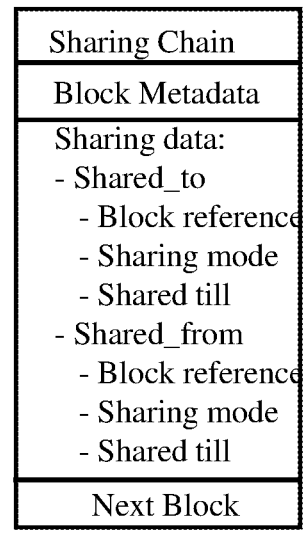
FIG. 7D illustrates an exemplary view of a sharing chain according to some embodiments herein.

FIG. 7A illustrates an exemplary blockchain 108 view of the plurality of block store nodes 110 of FIG. 1 according to some embodiments herein. The plurality of block store nodes 110 comprises one or more blocks 702A-N each comprising metadata of the block, and block data. FIG. 7B illustrates an exemplary blockchain 108 view of the plurality of block verifier nodes 112 of FIG. 1 according to some embodiments herein. The plurality of block store nodes 110 comprises one or more blocks 704A-N each comprising the metadata of the block only. FIG. 7C illustrates an exemplary view of a validation chain according to some embodiments herein. The validation chain comprises the metadata of the block and validation data comprising a validation data and a block reference of the block. FIG. 7D illustrates an exemplary view of a sharing chain according to some embodiments herein. The sharing chain comprises the metadata of the block and sharing data comprising sharing conditions such as one or more users to whom the large data (e.g. large and sensitive data) is shared with and a duration that it is shared for. The sharing data may be structured in a way that it can be stored in the blockchain 108.

Figure 8A:
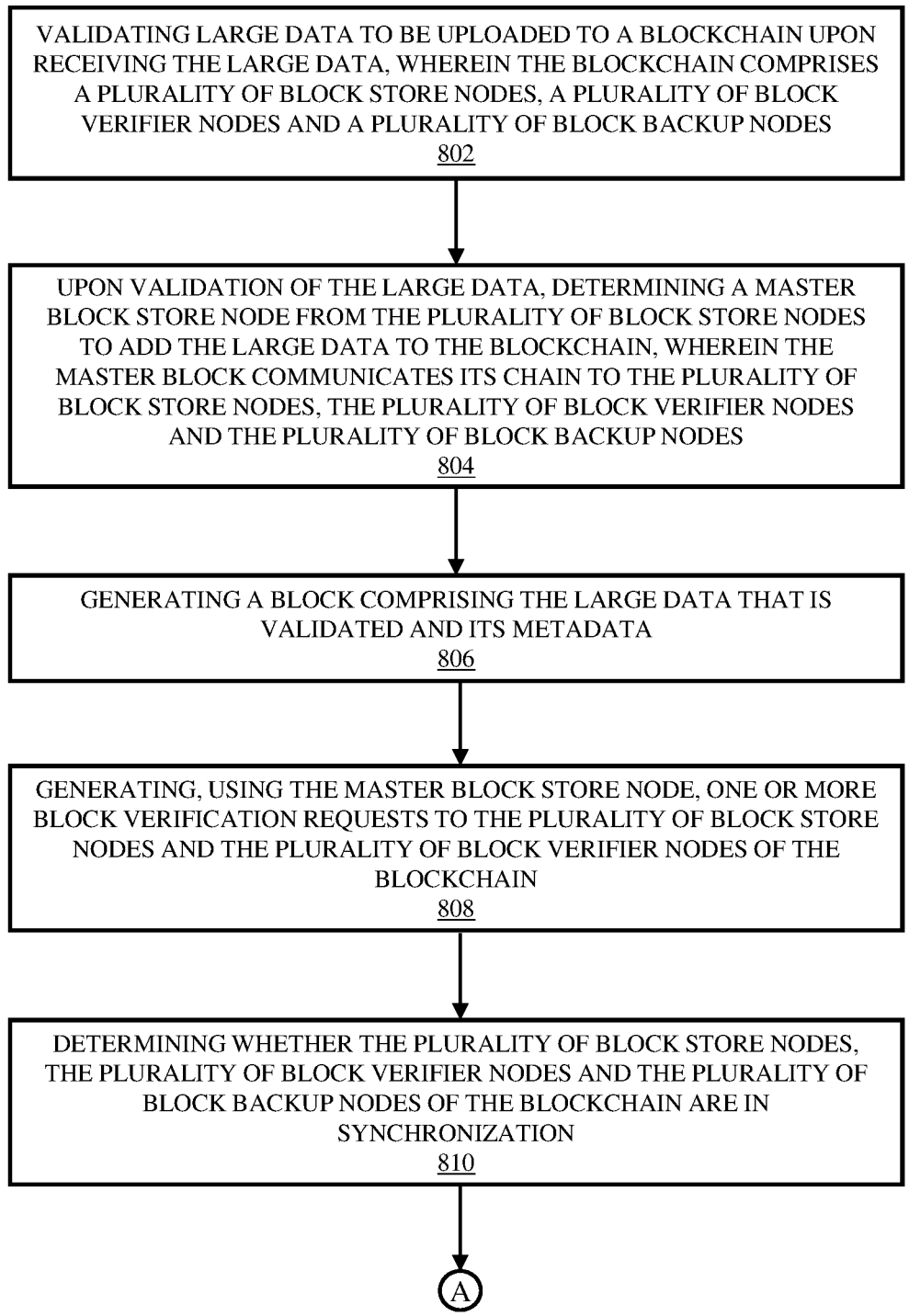
FIGS. 8A and 8B illustrate a computer implemented method for managing large data in the blockchain according to some embodiments herein.
Figure 8B:
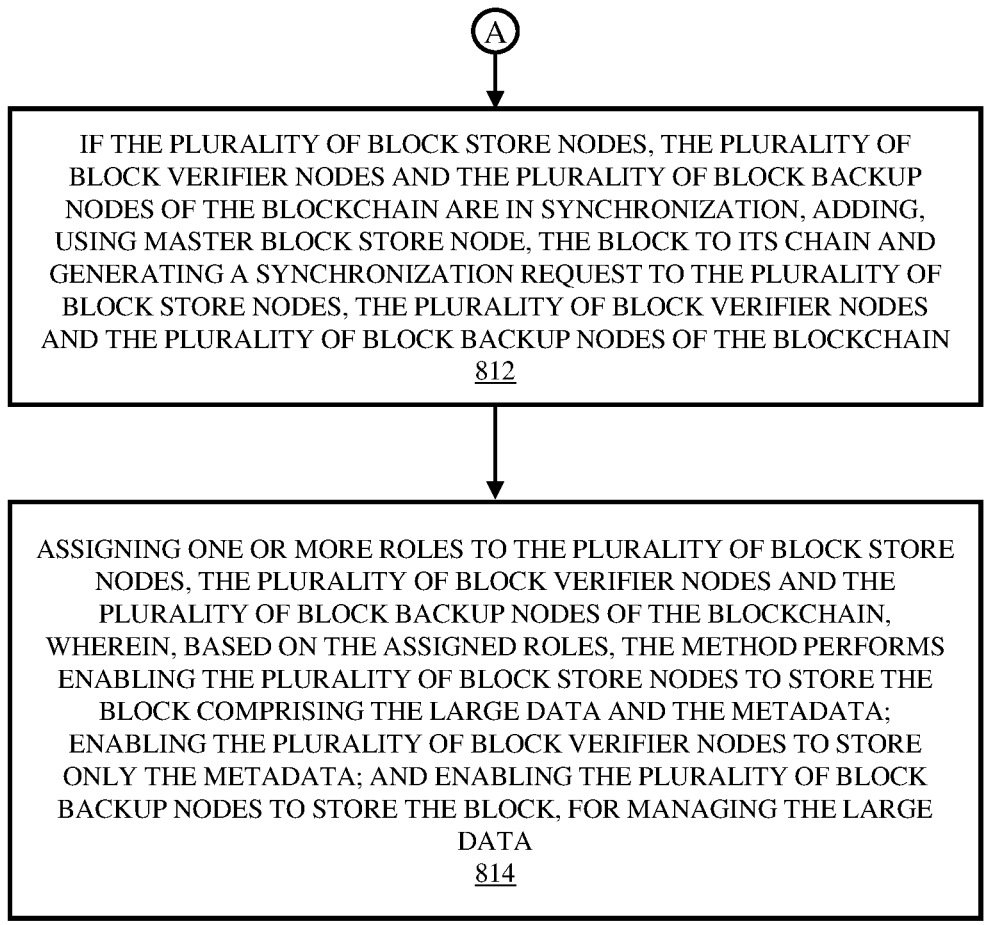

FIGS. 8A and 8B illustrate a computer implemented method for managing large data in the blockchain 108 according to some embodiments herein. At a step 802, large data (e.g. large and sensitive data) to be uploaded to the blockchain 108 is validated upon receiving the large data. The blockchain 108 comprises the plurality of block store nodes 110, the plurality of block verifier nodes 112 and the plurality of block backup nodes 114. At a step 804, upon validation of the large data, a master block store node is determined from the plurality of block store nodes 110 to add the large data to the blockchain 108. The master block store node communicates its chain to the plurality of block store nodes 110, the plurality of block verifier nodes 112 and the plurality of block backup nodes 114. At a step 806, a block 200 comprising the large data that is validated and its metadata 202 is generated. At a step 808, using the master block store node, one or more block verification requests is generated to the plurality of block store nodes 110 and the plurality of block verifier nodes 112 of the blockchain 108. At a step 810, it is determined whether the plurality of block store nodes 110, the plurality of block verifier nodes 112 and the plurality of block backup nodes 114 of the blockchain 108 are in synchronization. At a step 812, if the plurality of block store nodes 110, the plurality of block verifier nodes 112 and the plurality of block backup nodes 114 of the blockchain 108 are in synchronization, the block 200 is added to its chain and a synchronization request is generated to the plurality of block store nodes 110, the plurality of block verifier nodes 112 and the plurality of block backup nodes 114 of the blockchain 108, using the master block store node. At a step 814, one or more roles is assigned to the plurality of block store nodes 110, the plurality of block verifier nodes 112 and the plurality of block backup nodes 114 of the blockchain 108. Based on the assigned roles, the method performs (a) enabling the plurality of block store nodes 110 to store the block 200 comprising the large data and the metadata 202; (b) enabling the plurality of block verifier nodes 112 to store only the metadata 202; and (c) enabling the plurality of block backup nodes 114 to store the block 200, for managing the large data.

The present system and method facilitates management of the large data in the blockchain. In one embodiment, the large (and sensitive data) along with the metadata is stored in the plurality of block store nodes of the blockchain, while the metadata alone is stored on the plurality of block verifier nodes of the blockchain. In addition, the plurality of block backup nodes is used to back-up the blockchain and participates in data recovery only. This distributed architecture of the present system facilitates the large and sensitive data to be maintained "on the chain" of the blockchain and overcomes the drawbacks/challenges of existing blockchain data management.

In an example use case, for node deletion, all the data on the node is cleaned, then its information from the blockchain 108 is also removed. For a regular check of blockchain, the system 102 enables regular sync and checks that are configured to keep a timely check on the blockchain 108 across nodes to ensure all the data is intact and verifiable at all times. In case, if a node is getting out-of-sync frequently, the system 102 removes and blacklists it because it could be that someone is trying to do something nasty with chain infrastructure. In case, if enough nodes are not available, the system 102 may keep the uploaded data in a staging environment until the infrastructure is up and running again in expected state.

Due to higher trust and authenticity of the large data (e.g. large and sensitive data) stored in the blockchain 108 in a way as disclosed in the present disclosure, some of the example applications of the present disclosure are (a) store and controlled sharing of personal such as health lab reports, health records, (b) original work such as music album, painting, photos, videos etc., (c) legal documents such as notices, NDAs, approvals etc. The present disclosure has many other applications because of its capability to store any kind of data and by maintaining the properties of the blockchain 108 in its true sense.

The best mode/way of practicing the instant invention is that the invention can be created as a cloud-based platform where multiple blockchains can be created to cater to different kinds of data. Blockchain based document/data store, ensuring higher level of trust and offering it as a service.

The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk—read only memory (CD-ROM), compact disk-read/write (CD-R/W) and DVD.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
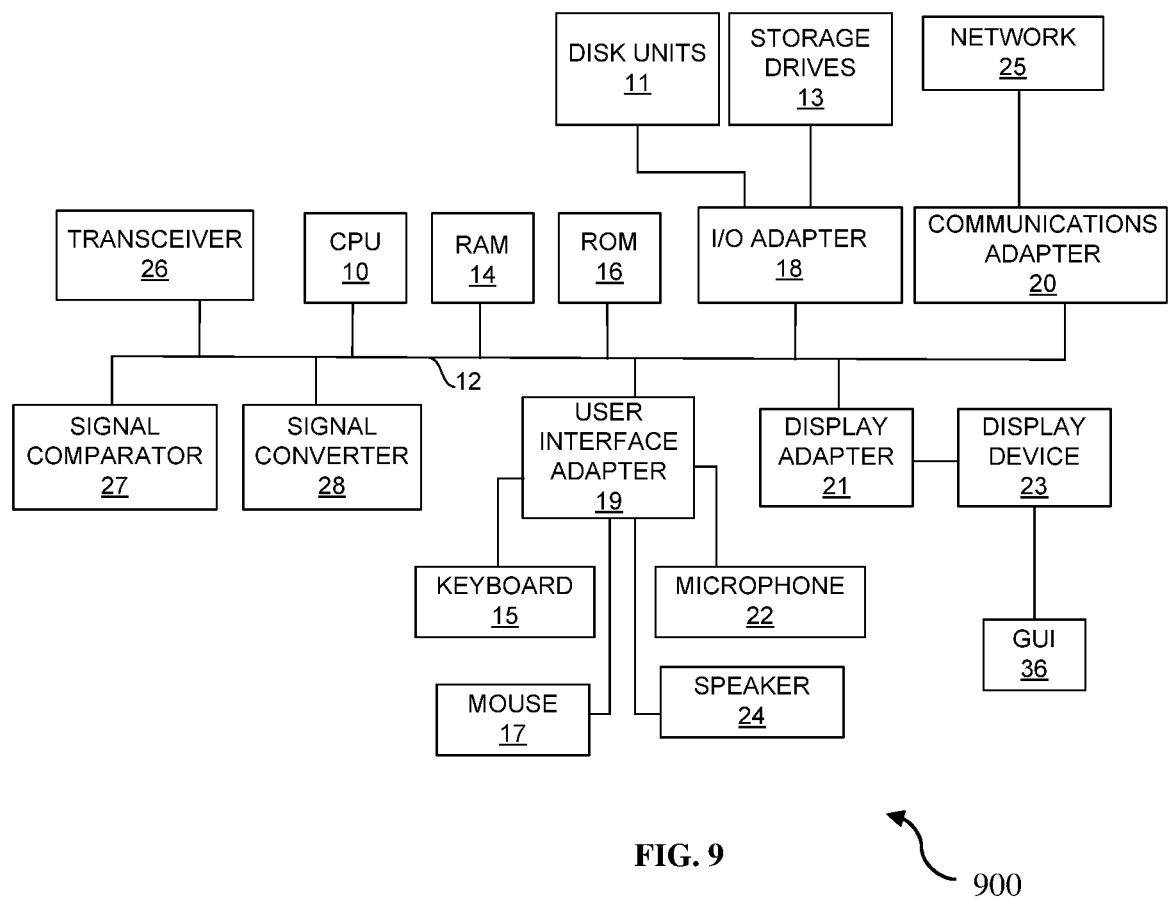
FIG. 9 is a schematic diagram of a computer architecture, in accordance with the embodiments herein.

A representative hardware environment for practicing the embodiments herein is depicted in FIG. 9, with reference to FIGS. 1 through 8B. This schematic drawing illustrates a hardware configuration of a software development device/computer system 900 in accordance with the embodiments herein. The system 900 comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 900 can read the inventive instructions on the program storage devices and follow these instructions to execute the methodology of the embodiments herein. The system 900 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

Merely for illustration, only representative number/type of block, and sub-block diagrams are shown. Many environments often contain many more block and sub-block diagrams or systems and sub-systems, both in number and type, depending on the purpose for which the environment is designed.

While specific embodiments of the present disclosure have been shown and described in detail to illustrate the inventive principles, it will be understood that the present disclosure may be embodied otherwise without departing from such principles.

While considerable emphasis has been placed herein on the specific features of the preferred embodiment, it will be appreciated that many additional features can be added and that many changes can be made in the preferred embodiment without departing from the principles of the present disclosure. These and other changes in the preferred embodiment of the present disclosure will be apparent to those skilled in the art from the present disclosure herein, whereby it is to be distinctly understood that the foregoing descriptive matter is to be interpreted merely as illustrative of the present disclosure and not as a limitation.

The use of the expression "at least" or "at least one" suggests the use of one or more elements or components, as the use may be in the embodiment of the present disclosure to achieve one or more of the desired objects or results. While certain embodiments of the present disclosure have been described, these embodiments have been presented by way of example only, and are not intended to limit the scope of the present disclosure. Variations or modifications to the formulation of this present disclosure, within the scope of the present disclosure, may occur to those skilled in the art upon reviewing the present disclosure herein. Such variations or modifications are well within the spirit of this present disclosure.

Reference throughout this specification to "some embodiments", "an embodiment", or similar language means that a particular feature, structure, or characteristic described in connection with the embodiment is included in at least one embodiment of the present disclosure. Thus, appearances of the phrases "in some embodiments", "in an embodiment" and similar language throughout this specification may, but do not necessarily, all refer to the same embodiment.

It should be understood that the figures and/or screenshots shown above highlighting the functionality and advantages of the present disclosure are presented for example purposes only. The present disclosure is sufficiently flexible and configurable, such that it may be utilized in ways other than that shown in the figures.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer implemented method for managing large data in a blockchain, comprising
   validating large data to be uploaded to a blockchain upon receiving the large data, wherein the blockchain comprises a plurality of block store nodes, a plurality of block verifier nodes and a plurality of block backup nodes;
   upon validation of the large data, determining a master block store node from the plurality of block store nodes to add the large data to the blockchain, wherein the master block store node communicates its chain to the plurality of block store nodes, the plurality of block verifier nodes and the plurality of block backup nodes;
   generating a block comprising the large data that is validated and its metadata;
   generating, using the master block store node, one or more block verification requests to the plurality of block store nodes and the plurality of block verifier nodes of the blockchain;
   determining whether the plurality of block store nodes, the plurality of block verifier nodes and the plurality of block backup nodes of the blockchain are in synchronization; and
   if the plurality of block store nodes, the plurality of block verifier nodes and the plurality of block backup nodes of the blockchain are in synchronization, adding, using the master block store node, the block to its chain and generating a synchronization request to the plurality of block store nodes, the plurality of block verifier nodes and the plurality of block backup nodes of the blockchain; and
   assigning one or more roles to the plurality of block store nodes, the plurality of block verifier nodes and the plurality of block backup nodes of the blockchain,
   wherein, based on the assigned roles, the method performs:
   enabling the plurality of block store nodes to store the block comprising the large data and the metadata;
   enabling the plurality of block verifier nodes to store only the metadata; and
   enabling the plurality of block backup nodes to store the block, for managing the large data.

2. The computer implemented method of claim 1, wherein the method comprises adding a new node to the blockchain by collecting the new node properties comprising at least one of a type of node or its configuration.

3. The computer implemented method of claim 1, wherein the method comprises pre-approving a set of new nodes with its properties into at least one of the plurality of block store nodes, the plurality of block verifier nodes or the plurality of block backup nodes, wherein when a new node is added to the blockchain, the method determines a role to assign to the new node based on the pre-approval.

4. The computer implemented method of claim 1, wherein the method comprises:
   configuring a sensitivity of the large data based on a sensitivity level that is predefined for the type of the large data to be stored in the blockchain; and
   mapping the sensitivity level to the plurality of block store nodes and the plurality of block verifier nodes in the blockchain and determining a role for the plurality of block store nodes and the plurality of block verifier nodes based on the sensitivity level.

5. The computer implemented method of claim 1, wherein the method comprises adding one or more nodes as a data validator to validate the large data before adding the large data to the blockchain.

6. The computer implemented method of claim 1, wherein the method comprises:
   providing a user interface that allows a user to upload the large data to the blockchain; and
   storing the large data that is uploaded in a staging area of the blockchain until the large data is validated.

7. The computer implemented method of claim 1, wherein if a type of the large data is transaction data, the method validates the large data by referring to a content of a latest block in the blockchain and performing an operation comprising an addition or a deletion of data, wherein if the type of the large data is non-transaction data, the method validates the large data using a smart contract which sends a notification to a validator associated with the non-transaction data.

8. The computer implemented method of claim 1, wherein the method comprises adding the block with the large data to the blockchain and marking the block validation as false in the metadata of the block, wherein when the validation of the large data is completed, the block is marked as validated.

9. The computer implemented method of claim 1, wherein the method comprises implementing a validation chain that comprises only the metadata of the block and a validation state of the block, instead of replicating the block again in the blockchain, thereby optimizing a storage space of the blockchain, wherein when there is a change to the large data of the block, the method creates a new block.

10. The computer implemented method of claim 1, wherein the metadata comprises information for validating (i) the block's position in the blockchain and (ii) the large data and the metadata of the block, wherein the metadata comprises at least one of a block header, a hash of the block and previous blocks, a pointer to a next block, or a timestamp of the block.

11. The computer implemented method of claim 1, wherein if all the plurality of block store nodes, the plurality of block verifier nodes and the plurality of block backup nodes of the blockchain are not in synchronization, the method checks whether a minority of nodes from the plurality of block verifier nodes and the plurality of block backup nodes are not in synchronization,
   if yes, the method generates the synchronization request to the minority of nodes that are not in synchronization, or
   if no, the method identifies that the chain is corrupted and restores the chain from the plurality of block backup nodes.

12. One or more non-transitory computer readable storage mediums configured with instructions executable by one or more processors to cause the one or more processors to perform a method of managing large data in a blockchain, comprising:
   validating large data to be uploaded to a blockchain upon receiving the large data, wherein the blockchain comprises a plurality of block store nodes, a plurality of block verifier nodes and a plurality of block backup nodes;
   upon validation of the large data, determining a master block store node from the plurality of block store nodes to add the large data to the blockchain, wherein the master block store node communicates its chain to the plurality of block store nodes, the plurality of block verifier nodes and the plurality of block backup nodes;
   generating a block comprising the large data that is validated and its metadata;

generating, using the master block store node, one or more block verification requests to the plurality of block store nodes and the plurality of block verifier nodes of the blockchain;

determining whether the plurality of block store nodes, the plurality of block verifier nodes and the plurality of block backup nodes of the blockchain are in synchronization; and if the plurality of block store nodes, the plurality of block verifier nodes and the plurality of block backup nodes of the blockchain are in synchronization, adding, using the master block store node, the block to its chain and generating a synchronization request to the plurality of block store nodes, the plurality of block verifier nodes and the plurality of block backup nodes of the blockchain; and assigning one or more roles to the plurality of block store nodes, the plurality of block verifier nodes and the plurality of block backup nodes of the blockchain, wherein, based on the assigned roles, the method performs:
enabling the plurality of block store nodes to store the block comprising the large data and the metadata;
enabling the plurality of block verifier nodes to store only the metadata; and
enabling the plurality of block backup nodes to store the block, for managing the large data.

13. The one or more non-transitory computer readable storage mediums storing the one or more sequences of instructions of claim 12, which when executed by the one or more processors, further causes:
configuring a sensitivity of the large data based on a sensitivity level that is predefined for the type of the large data to be stored in the blockchain; and
mapping the sensitivity level to the plurality of block store nodes and the plurality of block verifier nodes in the blockchain and determining a role for the plurality of block store nodes and the plurality of block verifier nodes based on the sensitivity level.

14. The one or more non-transitory computer readable storage mediums storing the one or more sequences of instructions of claim 12, wherein if a type of the large data is transaction data, the method validates the large data by referring to a content of a latest block in the blockchain and performing an operation comprising an addition or a deletion of data, wherein if the type of the large data is non-transaction data, the method validates the large data using a smart contract which sends a notification to a validator associated with the non-transaction data.

15. The one or more non-transitory computer readable storage mediums storing the one or more sequences of instructions of claim 12, which when executed by the one or more processors, further causes implementing a validation chain comprising only the metadata of the block and a validation state of the block, instead of replicating the block again in the blockchain, thereby optimizing a storage space of the blockchain, wherein when there is a change to the large data of the block, the method creates a new block.

16. The one or more non-transitory computer readable storage mediums storing the one or more sequences of instructions of claim 12, wherein if all the plurality of block store nodes, the plurality of block verifier nodes and the plurality of block backup nodes of the blockchain are not in synchronization, the one or more processors further causes a method that determines whether a minority of nodes from the plurality of block verifier nodes and the plurality of block backup nodes are not in synchronization, if yes, the method generates the synchronization request to the minority of nodes that are not in synchronization, or if no, the method identifies that the chain is corrupted and restores the chain from the plurality of block backup nodes.

17. A system for managing large data in a blockchain, comprising:
one or more processors; and
one or more non-transitory computer-readable memories coupled to the one or more processors and configured with instructions executable by the one or more processors to cause the system to perform operations comprising:
validating large data to be uploaded to a blockchain upon receiving the large data, wherein the blockchain comprises a plurality of block store nodes, a plurality of block verifier nodes and a plurality of block backup nodes;
upon validation of the large data, determining a master block store node from the plurality of block store nodes to add the large data to the blockchain, wherein the master block store node communicates its chain to the plurality of block store nodes, the plurality of block verifier nodes and the plurality of block backup nodes;
generating a block comprising the large data that is validated and its metadata;
generating, using the master block store node, one or more block verification requests to the plurality of block store nodes and the plurality of block verifier nodes of the blockchain;
determining whether the plurality of block store nodes, the plurality of block verifier nodes and the plurality of block backup nodes of the blockchain are in synchronization; and
if the plurality of block store nodes, the plurality of block verifier nodes and the plurality of block backup nodes of the blockchain are in synchronization, adding, using the master block store node, the block to its chain and generating a synchronization request to the plurality of block store nodes, the plurality of block verifier nodes and the plurality of block backup nodes of the blockchain; and
assigning one or more roles to the plurality of block store nodes, the plurality of block verifier nodes and the plurality of block backup nodes of the blockchain,
wherein, based on the assigned roles, the system:
enables the plurality of block store nodes to store the block comprising the large data and the metadata;
enables the plurality of block verifier nodes to store only the metadata; and
enables the plurality of block backup nodes to store the block, for managing the large data.

18. The system of claim 17, wherein the system generates a sharing chain that includes a signature of the block and sharing conditions comprising details of one or more users to whom the large data to be shared with and a duration that the large data to be shared for, wherein when the system creates a sharing block, the blockchain triggers a smart contract to add a reference of the large data that is shared in their respective chain which enables a desired user to edit/view the shared large data when the desired user accesses the blockchain, wherein the system comprises a block processor node that processes the large data.

19. The system of claim 17, wherein if a type of the large data is transaction data, the system validates the large data by referring to a content of a latest block in the blockchain and performs an operation comprising an addition or a deletion of data, wherein if the type of the large data is non-transaction data, the system validates the large data using a smart contract which sends a notification to a validator associated with the non-transaction data.

20. The system of claim 17, wherein if all the plurality of block store nodes, the plurality of block verifier nodes and the plurality of block backup nodes of the blockchain are not in synchronization, the system checks whether a minority of nodes from the plurality of block verifier nodes and the plurality of block backup nodes are not in synchronization,
if yes, the system generates the synchronization request to the minority of nodes that are not in synchronization, or
if no, the system identifies that the chain is corrupted and restores the chain from the plurality of block backup nodes.

\* \* \* \* \*